E. A. WRIGHT

VEHICLE BODY

June 13, 1933.

Re. 18,866

Original Filed Aug. 2, 1926

INVENTOR
Edward A. Wright
BY White & Root
his ATTORNEYS

Reissued June 13, 1933 Re. 18,866

UNITED STATES PATENT OFFICE

EDWARD A. WRIGHT, OF PALO ALTO, CALIFORNIA, ASSIGNOR, BY MESNE ASSIGNMENTS, TO TERNSTEDT MANUFACTURING COMPANY, OF DETROIT, MICHIGAN, A CORPORATION OF MICHIGAN

VEHICLE BODY

Original No. 1,861,828, dated June 7, 1932, Serial No. 126,576, filed August 2, 1926. Application for reissue filed November 28, 1932. Serial No. 644,726.

My invention relates to the construction of closed bodies for vehicles such as automobiles, and relates more particularly to the construction and arrangement of the windows thereof.

An object of my invention is to provide a window construction in a closed body such that the motion of the vehicle is utilized to ventilate the interior of the vehicle without causing drafts.

Another object of the invention is to provide a window construction in the body of a closed vehicle such that ventilation may be secured in inclement weather without readily permitting the entry of rain or snow to the interior of the vehicle.

Another object of the invention is to provide a closed body having a slanting windshield and corner posts of a small size.

The invention possesses other advantageous features, some of which with the foregoing will be set forth at length in the following description where I shall outline in full that form of my invention which I have selected for illustration in the drawing accompanying and forming part of the present specification. In said drawing I have shown one form of improved vehicle body embodying my invention, but it is to be understood that I do not limit myself to such form, since the invention, as set forth in the claims, may be embodied in a plurality of forms.

Figure 1:
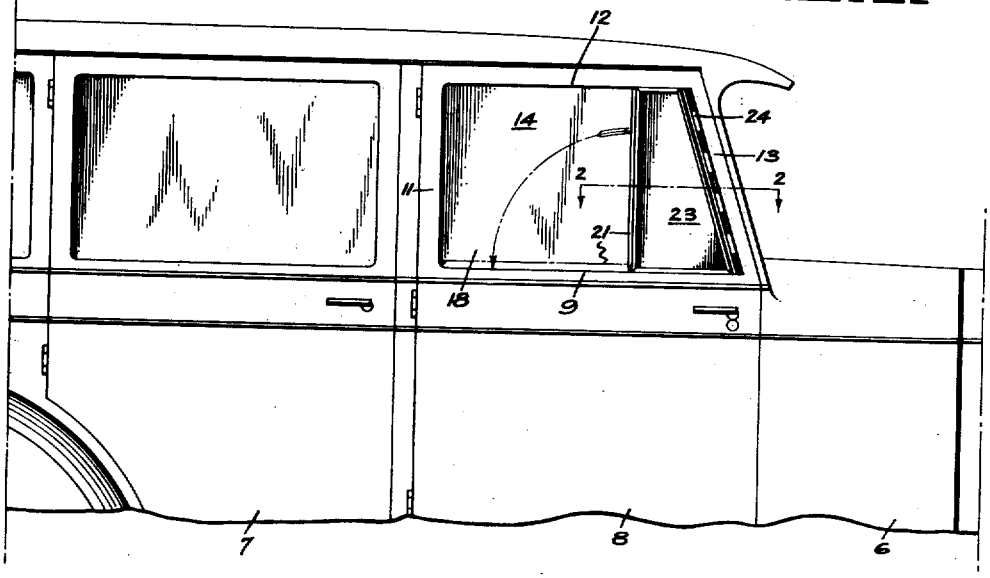
Fig. 1 is a side elevation of a portion of a closed automobile body provided with the construction of my invention.

Broadly speaking, the vehicle body of my invention comprises a window frame having a sliding window for closing a portion thereof and a hinged window for closing the remaining portion thereof.

In the construction of closed vehicle bodies, particularly bodies in which the front door jamb also forms the corner post for the windshield, it has been difficult to provide a slanting windshield without making the corner post disadvantageously large. The desirability of a slanting windshield is widely recognized and in order to satisfy the demand numerous complicated constructions have been resorted to. In practically every instance the corner ports have been so encumbered or enlarged that road vision has been dangerously interfered with. With the construction of my invention it is a simple matter to provide a slanting windshield and at the same time to keep the size of the corner posts compartively small. In addition it is possible with my improved construction to ventilate thoroughly and well the interior of the vehicle without producing violent drafts. This is accomplished by providing a window which can be positioned so that the motion of the vehicle tends to induce air to flow from the interior of the vehicle. The window may also be positioned to permit the influx of a current of air into the vehicle body.

In the embodiment of the invention shown in the drawing, the vehicle body 6 is provided with a rear door 7 and a front door 8. Both of the doors are of the usual construction and the front door 8 is provided with a window frame comprising a bottom sill 9, a rear piece 11, a top piece 12 and a front piece 13. The four pieces form a quadrilateral frame around the window opening 14. The forward piece 12 is either upright or is slanted at any desired angle or degrees and is complementary to the corner post 16 which is adapted to receive the windshield 17. The corner post and the window frame are both preferably made of cooperating pressed steel parts in order to reduce their combined size and increase their strength.

The rear portion of the window opening 14 is provided with a vertically sliding glass window 18 of the usual type. The rear edge of the window 18 is fitted into a suitable groove in the rear piece 11 in the usual way and its front edge slides in a slot 19 in the door 8 in the customary manner. The groove and slot and the intervening space forms the window well. A continuation of the slot 19 is provided in a guide 21 which is a suitable steel channel lined with felt or other cushioning material and receives the front edge of the glass 18. The guide is provided at its lower end with a hinge 22 by means of which it is fastened to the bottom sill 9 of the door frame. The upper end of the guide 21 may if desired, be provided with a suitable catch to fasten it to the upper piece 12 of the door frame. The disposition and the length of the guide 21 are such that the guide may be swung down on top of the lower sill 9 when the window 18 is lowered into the door 8.

Figure 2:
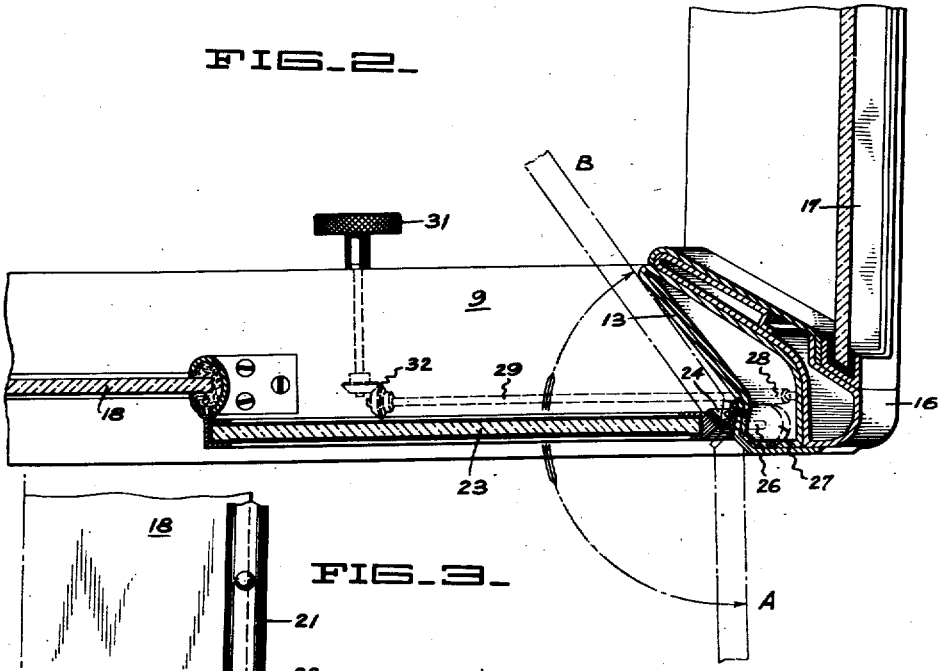
Fig. 2 is a cross section of a portion of the vehicle body, the plane of section being taken on line 2—2 of Fig. 1.
Figure 3:
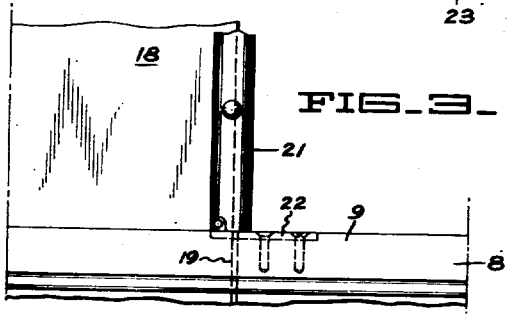
Fig. 3 is an enlarged detail showing in side elevation a portion of the window guide.

The trapezoidal remaining portion of the window opening 14 is closed by a suitably shaped window 23. The second window 23 is hinged along its forward edge by means of a hinge 24 of the piano type to the forward piece of the window frame. The window 23 is so mounted that it may be swung outwardly from the window frame for approximately 90 degrees as indicated by the dotted lines showing position A in Fig. 2. The hinge 24 also permits the window 23 to be turned inwardly when the window 18 and the guide 21 are lowered, to lie against the forward member 13 of the window frame as shown in position B of Fig. 2. The glass of the window 23 may be made somewhat shorter so that the window can swing in and out freely without lowering the guide 21.

When the window 23 is in position A or any intermediate position, the motion of the vehicle induces air to flow from the interior of the vehicle outwardly and ventilates the interior of the vehicle without causing an unwanted draft of air upon the occupants.

When the window 23 is swung inwardly to the position B, the motion of the vehicle permits a current of air to pass through the space between the guide 21 and the front piece 13 and supplies the interior of the vehicle with fresh air.

Means are provided for positioning the window 23 and maintaining it in the desired position. The central rotating rod 26 of the hinge 24 is continued downwardly through the lower sill 9 and into the interior of the door 8. The lower end of the rod 26 is provided with a worm wheel 27. A worm 28 mounted on a suitable shaft 29 engages the worm wheel 27 and is turned by a hand wheel 31 through suitable intermediate gearing 32. Rotation of the hand wheel 31 in an appropriate direction rotates the window 23 to any desired position. Since the worm 28 and worm wheel 26 are irreversible, the position of the window 23 as determined by the hand wheel 31 is unaffected by any other pressure or force.

It will be appreciated that with the window construction of my invention it is possible to provide a slanting windshield without heavy corner posts and that it is possible to obtain adequate ventilation without objectionable drafts.

I claim:

1. In a vehicle body, a door forming a part of the body and having a unitary window frame, a guide extending across said frame, a window slidable in said door along one side of said frame and slidable in said guide, and a second window hinged to said door on the opposite side of said frame and adapted to close the opening between said opposite side and said guide.

2. In a vehicle body, a door forming a part of the body and having a unitary window frame, a guide pivoted to the frame and extending across the opening therein and parallel to one side of said frame, a window adapted slidably to close the opening between said one side and said guide, and a second hinged window adapted to close the opening between the opposite side of said window frame and said guide and means connected with the second window for opening or closing the same.

3. In a vehicle body, a window frame having a window opening therein, a vertically slidable window adapted to close only the rear portion of said window opening, and a second window mounted on the forward portion of said window frame, mounting means for the second window permitting the window to be opened inwardly or outwardly of the vehicle.

4. In a vehicle body, a door forming a part thereof and provided with a window opening in the upper portion of the door, a guide fixed to the door arranged to divide the window opening, a window slidable within the door between the guide and one side of the door to close the window opening on one side of the guide, a second window hinged to the door to close the opening on the other side of the guide, the second window being hinged so as to open inwardly or outwardly of the vehicle body, and means within the door and cooperating with the second window to adjust and hold the same.

5. In a vehicle body, a door forming a part thereof and provided with a window opening in the upper portion of the door, a guide fixed to the door arranged to divide the window opening, a window slidable within the door between the guide and one side of the door to close the window opening on one side of the guide, a second window hinged to the door to close the opening on the other side of the guide, the second window being hinged so as to open inwardly or outwardly of the vehicle body, and manually operable gear means in the door for moving the said second window.

6. In a vehicle body, a door forming a part thereof and having a window frame, a guide pivoted to and extending across said frame, a window slidable in said body along one side of the frame and slidable in said guide, a second window pivoted on the opposite side of the frame for closing the opening between said opposite side and the guide, and means connected with the second window for moving the same said means including an irreversible gear connection mounted within the door.

7. In a vehicle body, a window frame divided by a guide pivoted at one side of the frame, a sliding window within the body and adapted to slide in said guide, to close one portion of the window frame, a second window pivoted at one side of the frame to swing inwardly or outwardly of the vehicle and to close the remaining portion of the window frame, the guide being foldable on the frame to cover one end of the sliding window when the window is fully open.

8. A vehicle body having a windshield mounted in the front portion thereof, doors swingably mounted in the sides thereof, adjacent the ends of said windshield, a pair of panels movably mounted in the upper portions of each of said doors, one of said panels in each door being vertically pivoted to the forward door pillar and swingable outwardly toward the plane of said windshield, the other panel in each door being vertically slidable in the plane thereof.

9. A window for a vehicle body comprising a window casing having a well therein, a panel slidably mounted in said casing and adapted to close a portion thereof, a second panel pivotally mounted in said casing and swingable on an up and down axis out of the plane thereof and adapted to cooperate with said sliding panel in closing said casing.

10. A window for a vehicle body comprising a window casing having a well in the lower portion thereof, a transparent panel mounted to slide vertically in said casing and well and adapted to close a portion of the window opening, a second transparent panel pivotally mounted on an up and down axis in said casing adjacent the window opening and swingable to cooperate with said sliding panel in closing said window opening.

11. The combination with a vehicle body having a frame including a window well and a window opening, of a movable glass panel arranged when raised from the window well to close a portion of the window opening, a glass panel swinging on an up and down axis, the said panel complementing said movable panel to be able to close said window opening and arranged to have at least a portion swung outwardly to facilitate ventilation by causing and accelerating the exchange of air between the inside and outside of the vehicle.

12. The combination with a vehicle body having a frame including a window well and a window opening, of a sliding glass panel arranged when raised from the window well to close a portion of the window opening, a glass panel swinging on an up and down axis, the said swinging panel complementing said sliding panel to be able to close said window opening and arranged to be adjusted to different positions, one set of adjustments to induce the flow of air from the interior of the vehicle and the other to permit the influx of air into the vehicle body.

13. The combination with a vehicle body having a frame including a window well and a window opening, of a sliding glass panel arranged when raised from the window well to close a portion of the window opening, a glass panel swinging on an up and down axis, a spacing member for the two panels but which can be disposed out of the window opening, the said swinging panel complementing said sliding panel to be able to close said window opening and arranged to be adjusted to different positions, one set of adjustments for inducing the flow of air from the interior of the vehicle and the other to permit the influx of air into the vehicle body, the said spacing member being movable to permit of some of said adjustments.

14. The combination with a vehicle body having a frame including a window well and a window opening, of a sliding glass panel arranged to be raised from the window well to close a portion of the window opening, a glass panel swinging on an up and down axis arranged to cooperate with the sliding panel to close the said window opening, and adjustable to permit exchange of air between the inside and outside of the body, and irreversible means for securing and maintaining such adjustment.

15. The combination with a vehicle body having a frame including a window well and a window opening, of a sliding glass panel arranged to be raised from the window well to close a portion of the window opening, a glass panel swinging on an up and down axis arranged to cooperate with the sliding panel to close the said window opening and adjustable to permit exchange of air between the inside and outside of the body, and a window regulator for securing such adjustment.

16. In combination with a vehicle body having a window frame defining a window opening and a window well below the opening fixedly related thereto, of a slidable window panel arranged when raised from the window well to close only the rear portion of the window opening, and a complementary window panel arranged to swing out on an upwardly extending axis and pivotally supported upon said frame, said swinging panel arranged in one position to close the forward remaining portion of the window opening and in other positions to regulate ventilation of the interior of the vehicle.

17. The combination with a vehicle body having a window frame defining a window opening and a window well located below said opening, of a slidable glass window panel arranged when raised from the window well to close only a portion of the window opening, a complementary glass panel swinging on an upwardly extending axis and arranged in one position for closing the remaining portion of the window opening, and spacing means between the glass edges of the panels when the same are in closed position, said means being movable from its working position in the window opening.

18. The combination with a vehicle body having a window frame defining a window opening and a window well joined to said frame and located therebelow, of a sliding glass window panel arranged when raised from the window well to close a portion of said opening and a ventilating window panel swingable on an upwardly extending axis arranged in one position to cooperate with the sliding panel to close the window opening and interconnecting means for connecting the glass panels and occupying the space between the glass edges when the panels are closed and arranged for optional disposition out of the operative position in the window opening.

19. The combination with a vehicle body having a door frame with a window well and a window opening thereabove, said frame including a forward door pillar inclined rearwardly from bottom to top, and a pair of complementary glass panels arranged to cooperate together as a closure for the window opening, one slidable in the well and the other swingable on an upwardly extending axis and pivotally supported on the said door frame in the window opening, said swinging panel arranged to be manipulated to accelerate the exchange of air through said window opening, the swinging panel having one edge adjoining the slanting door pillar.

In testimony whereof, I affix my signature.

EDWARD A. WRIGHT.